United States Patent Office 3,243,436
Patented Mar. 29, 1966

3,243,436
METHOD OF PREPARING SUBSTITUTED TRIAZINES
Francis Xavier Markley, Piscataway Township, Middlesex County, N.J., and Erwin Richard Ruckel, Syracuse, N.Y., assignors to American Cyanamid Company, Stamford, Conn., a corporation of Maine
No Drawing. Filed Nov. 27, 1963, Ser. No. 326,343
7 Claims. (Cl. 260—248)

This invention relates to a new method of preparing trisubstituted triazines. More particularly, it relates to a process of preparing 2,4,6-trisubstituted-1,3,5-triazines.

The novel trisubstituted triazines prepared by the process of this invention may be illustrated by the formula:

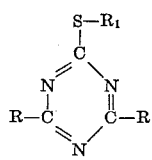

wherein R is lower alkyl or mononuclear aryl and $R_1$ is lower alkyl.

The process of the present invention comprises heating about two moles of an imidate with one mole of a lower alkyl thiocyanate, preferably in the presence of an acid catalyst. The lower alkyl thiocyanates can be, for example, methylthiocyanate, ethylthiocyanate, propylthiocyanate, butylthiocyanate and the like.

The reaction described above may be illustrated as follows:

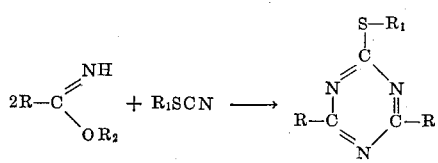

wherein R and $R_1$ are as defined above and $R_2$ is alkyl.

The starting imidates for the process of this invention are described in chemical textbooks such as Synthetic Organic Chemistry (John Wiley and Sons, Inc.), New York and London, 1953, page 634. The other starting material, namely, thiocyanates can be, for example, lower alkyl thiocyanates such as methylthiocyanate, ethylthiocyanate, propylthiocyanate, butylthiocyanate or the like. Also mononuclear aryl thiocyanates can be used such as phenylthiocyanate and the like.

The novel process of this invention may be carried out by mixing approximately two moles of an imidate such as described hereinbefore with approximately one mole of a lower alkylthiocyanate preferably in the presence of an acid catalyst. The reaction mixture is heated at a temperature of from about 80° C. to 120° C. for a period of a few hours to 10–12 hours.

The acid catalysts which have been found useful in the process of the present invention includes strong acids such as hydrochloric acid, hydrobromic acid, sulfuric acid, phosphoric acid, p-toluenesulfonic acid, trichloroacetic acid and the like. The catalysts may also be a strong acid salt of weak bases such as ammonium chloride, ammonium bromide, ammonium sulfate, triethylammonium sulfate, pyridine hydrochloride, pyridine hydrobromide and the like. The amount of catalyst present in the reaction is in catalytic amounts which may range from 1/50 to 1/5 mole.

When the reaction is substantially complete, the desired product is recovered from the crude reaction mixture by conventional methods such as solvent extraction and fractional distillation.

The 2,4,6-trisubstituted-1,3,5-triazines prepared by the process of this invention are useful as intermediates in the preparation of substituted triazino sulfonamides, for example, 2,4-diethyl-6-methylthio-1,3,5-triazine, prepared as described in Examples I and II, may be reacted with sodium sulanilamide to form 2-sulfanilamido-4,6-diethyl-1,3,5-triazine, a highly active anti-bacterial agent. The latter product for example is described in Australian Patent 242,537 published in the Australian Official Journal of Patents, January 31, 1963. In a similar manner, other 2,4,6-trisubstituted-1,3,5-triazines can be reacted to produce the corresponding substituted triazino sulfonamides.

The following examples describe in detail the preparation of 2,4,6-trisubstituted-1,3,5-triazines.

Example I.—Preparation of 2,4-diethyl-6-methylmercapto-s-triazine

A mixture of 5.1 g. (.070 m.) methylthiocyanate, 16.1 g. (.140 m.) isopropylpropionimidate and .67 g. (.0035 m.) p-toluenesulfonic acid monohydrate is warmed to and maintained at 100° C. for 12 hours. A complete solution results soon after temperature reaches 100° C. The reaction mixture is then cooled to room temperature, 150 ml. of methylene chloride added and the resulting solution washed with 50 ml. of cold water. This first water wash is backwashed with 50 ml. methylene chloride, the organic layers combined and twice washed with 50 ml. of cold water. The organic layer is dried over anhydrous sodium sulfate, filtered and concentrated by distillation under reduced pressure. The residue is vacuum distilled to give 6.3 g. (49.3%) of a mixture of 2,4,6-triethyl-s-triazine and 2,4-diethyl-6-methylmercapto-s-triazine. The pure 2,4-diethyl-6-methylmercapto-s-triazine is obtained by fractional distillation employing a column of three theoretical plates, melting point 35.9°–36.8° C., boiling point 98°–100° C./6 mm.

Example II.—Preparation of 2,4-diethyl-6-methylmercapto-s-triazine

The process of Example I is repeated with the exception that the acid catalyst employed is .18 g. (.0035 m.) ammonium chloride. Distillation under reduced pressure gives 4.6 g. of a mixture of triazines as shown in Example I.

Example III.—Preparation of 2,4-diethyl-6-ethylmercapto-s-triazine

A mixture of 6.1 g. (.070 m.) ethylthiocyanate, 16.1 g. (.140 m.) isopropylpropionimidate and .67 g. (.0035 m.) p-toluenesulfonic acid monohydrate is heated to reflux for 6 hours. The reaction mixture is then cooled to room temperature and diluted with 100 ml. of methylene chloride. The organic solution is washed several times with 25 ml. portion of cold water and then dried over anhydrous sodium sulfate. Removal of solvent and distillation under reduced pressure of the residue gives 6.7 g. (50%) of a mixture of 2,4,6-triethyl and 2,4-diethyl-6-ethylmercapto-s-triazine. The pure 2,4-diethyl-6-ethylmercapto-s-triazine is isolated by a vacuum fractional distillation of the mixture. The progress of the fractionation can be followed by vapor phase chromatography.

Example IV.—Preparation of 2,4-diethyl-6-ethylmercaptoo-s-triazine

A further experiment is carried out similar to Example III except that in this experiment the acid catalyst is .40 g. (.0035 m.) trifluoroacetic acid. A similar mixture of s-triazine listed in Example III is obtained. Isolation of the 2,4-diethyl-6-ethylmercapto-s-triazine is carried out as described in previous examples.

*Example V.—Preparation of 2,4-diphenyl-6-methylthio-s-triazine*

A mixture of 5.1 g. (.070 m.) methylthiocyanate, 22.9 g. (.140 m.) isopropyl benzoimidate and .67 g. (.0035 m.) p-toluenesulfonic acid monohydrate is heated to reflux for 6 hours. The reaction mixture is cooled to room temperature and diluted with methylene chloride. Concentration and recrystallization of the residue from methylene chloride-petroleum ether gives 2,4-diphenyl-6-methylthio-s-triazine.

*Example VI.—Preparation of 2,4-dimethyl-6-phenylmercapto-s-triazine*

A mixture of 9.45 g. (.070 m.) phenylthiocyanate, 14.1 g. (.140 m.) isopropyl acetimidate and .18 g. (.0035 m.) ammonium chloride is heated to reflux for 6 hours. The product, 2,4-dimethyl-6-phenylmercapto-s-triazine is recovered as described in Examples I and III.

*Example VII*

A solution of sodium sulfanilamide is prepared by adding 43 g. of sulfanilamide to a solution of 5.75 g. of metallic sodium in 250 cc. of absolute methanol. To this solution is added 42 g. of 2,4-diethyl-6-methylmercapto-s-triazine prepared as shown in Example I above and the resulting solution is refluxed gently with the exclusion of moisture for about 70 hours. Cooling of the reaction mixture yields a copious white solid which is filtered, washed and dried. Concentration of the filtrate, followed by cooling, yields additional material. Analysis of the product together with its chemical properties demonstrates to be the sodium salt of 2-sulfanilamido-4,6-diethyl-s-triazine.

The above sodium salt of 2-sulfanilamido-4,6-diethyl-s-triazine when treated with hydrochloric acid produces 2-sulfanilamido-4,6-diethyl-s-triazine.

We claim:

1. A method of preparing compounds of the formula:

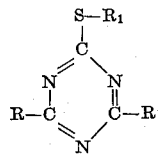

wherein R is selected from the group consisting of lower alkyl and mononuclear aryl and $R_1$ is lower alkyl which comprises reacting a compound of the formula:

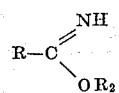

wherein R is as defined above and $R_2$ is an alkyl radical with a lower alkylthiocyanate in the presence of an acid catalyst.

2. A method of preparing 2,4-di(lower)alkyl-6-methylmercapto-s-triazine which comprises heating an imidate of the formula:

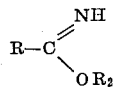

in which R and $R_2$ are lower alkyl with methylthiocyanate in the presence of p-toluenesulfonic acid monohydrate.

3. A method of preparing 2,4-di(lower)alkyl-6-methylmercapto-s-triazine which comprises heating an imidate of the formula:

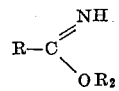

in which R and $R_2$ are lower alkyl with methylthiocyanate in the presence of ammonium chloride.

4. A method of preparing 2,4-diethyl-6-ethylmercapto-s-triazine which comprises heating isopropylpropionimidate with ethyl thiocyanate in the presence of p-toluenesulfonic acid monohydrate.

5. A method of preparing 2,4-diethyl-6-ethylmercapto-s-triazine which comprises heating isopropylpropionimidate and ethyl thiocyanate in the presence of trifluoroacetic acid.

6. A method of preparing 2,4-diphenyl-6-methylthio-s-triazine which comprises heating isopropylbenzoimidate and methylthiocyanate in the presence of p-toluenesulfonic acid monohydrate.

7. A method of preparing 2,4-dimethyl-6-phenylmercapto-s-triazine which comprises heating isopropylacetimidate and phenylthiocyanate in the presence of ammonium chloride.

No references cited.

WALTER A. MODANCE, *Primary Examiner.*

JOHN M. FORD, *Assistant Examiner.*